Dec. 1, 1959     E. A. SZIKLAS ET AL     2,914,915
RADIANTLY COOLED INLET
Filed Feb. 11, 1958
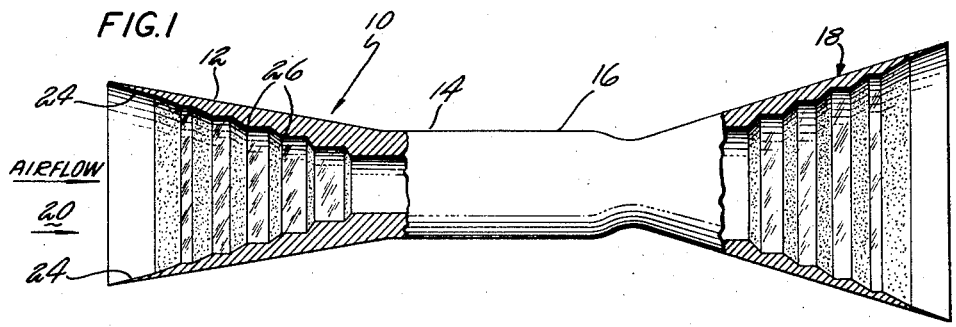
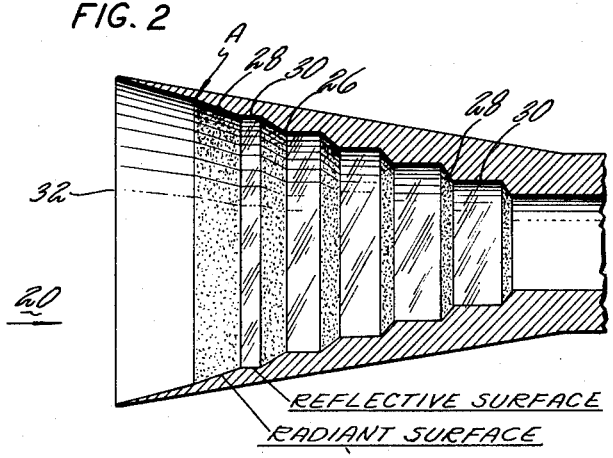
INVENTORS
EDWARD A. SZIKLAS
CONRAD M. BANAS
BY
ATTORNEY Patented Dec. 1, 1959

2,914,915
RADIANTLY COOLED INLET

Edward A. Sziklas and Conrad M. Banas, Manchester, Conn., assignors to United Aircraft Corporation, East Hartford, Conn., a corporation of Delaware Application February 11, 1958, Serial No. 714,637

5 Claims. (Cl. 60—35.6)

This invention relates to supersonic internal-compression inlets or exits such as exhaust nozzles and more particularly to means for increasing the radiant heat loss to reduce the temperature of the inlet or exit structure.

It is an object of this invention to provide an air inlet or exhaust nozzle which will remain relatively cool at high Mach number operation where aerodynamic heating normally causes excessive temperatures in the structural components of the inlet.

This and other objects of this invention will become readily apparent from the following detailed description of the drawing in which:

Fig. 1 is a schematic illustration in partial cross section showing an inlet utilizing this invention, and Fig. 2 is an enlargement of the convergent portion of the inlet shown in Fig. 1.

Referring to Fig. 1, an inlet is generally indicated at 10 as comprising a convergent portion 12, a throat section 14 and a combustion section 16. The air flowing through the inlet is emitted from the combustion section 16 into the exhaust nozzle 18. Air in the region 20 is approaching the inlet at relatively high Mach numbers and is received in the convergent portion 12 of the inlet. The convergent portion according to this invention has an inner wall or walls 24 which form internal compression surfaces for diffusing the flow at supersonic velocity. According to this invention, the inner wall or walls 24 have a certain degree of roughness as provided by a plurality of step portions 26 which protrude into the airstream. The same general type of roughness may be provided in the exhaust nozzle 18. The step portions 26 are formed of one or more inner surface portions 28 and 30 (Fig. 2). The roughness as formed by the surfaces 28 and 30 of the steps 26 is intended to increase the net radiation from within the inlet to the region of air outside the inlet at 20 or the exhaust nozzle.

As shown in Fig. 2, this roughness as provided by the steps 26 is greatly exaggerated to better describe the invention. Actually this roughness may be made as small as is practically feasible without reducing the effectiveness of the invention. The height of the roughness should be less than the thickness of the laminar sublayer portion of the boundary layer.

The steps 26 may be machined or formed on the inner walls 24 in any feasible manner. In any event, the surface portion 28 is at an angle relative to the axis of flow through the inlet and faces generally in an upstream direction toward the inlet opening. The surface portion 30 forming the other part of the step 26 is substantially parallel to the axis of flow through the inlet.

The surface portion 28 is roughened or worked in any suitable manner so that its characteristics approach the radiation capacity of a black body. In any event, the surface portions 28 are intended to have a relatively high emissivity.

On the other hand, the surface portions 30 which are substantially parallel with the axis of flow through the inlet are polished to provide a high reflectivity and hence a low absorption of thermal radiation. Thus, the inner surface 24 of the inlet beginning at a distance downstream of the opening 32 is formed by alternate segments or surface portions of reflectors and emitters. It will be noted that the roughness, or steps, inside the inlet does not begin until approximately the downstream point A on the inner wall 24 of the inlet. The reason for this is that any emission or radiation in the region defined by the point A and the upstream extremity thereof will normally be radiated out into the free stream and will not travel back and forth within the inlet where it can increase the temperature of the structure. Since the intensity of radiation obeys a cosine law with the angle normal to the emitting surface, almost half the total emitted radiation travels directly to the region 20 without there being any intermediate reflections and/or absorptions within the inlet itself. The remainder of the emitted radiation undergoes a minimum number of reflections and/or re-radiations before reaching the region 20.

It can be shown that at the same inlet wall temperature the surface of this invention radiates more than twice as much heat as a smooth air inlet surface.

Therefore, as a result of this invention it will be apparent that for a given structural capacity air inlets can operate at much higher Mach numbers without being seriously affected by aerodynamic heating. As a result, for a given high Mach number much lighter inlets can be manufactured while obtaining the same performance.

The cooling is obtained without cost in performance; i.e., no refrigerating system is required. The only expense is in initial machining or roughening.

Although only one embodiment of this invention has been illustrated and described herein, it will become apparent that various changes and modifications may be made in the construction and arrangement of the various parts without departing from the scope of this novel concept.

What it is desired by Letters Patent is:

1. In a duct forming a passage for conducting fluid at high supersonic velocities, said duct having an opening, said passage comprising an inner wall at an angle to the axis of flow through the duct and having a throat, and means forming the surface of said wall comprising a plurality of surface portions spaced from said opening, said surface portions alternating in the direction of flow and forming two cooperating sets of surfaces, one of said sets of surface portions being substantially parallel to the axis of flow through the passage and the other of said sets of surface portions being at an angle relative to said axis, said one set of surface portions being of relatively high reflectivity and said other of said sets of surface portions being of relatively high emissivity and receiving reflections from said one of said sets of surface portions, the surface of high emissivity facing substantially toward said opening for radiating heat in the direction of said opening, said surface portions forming an inner roughness in said duct which is at a maximum adjacent said throat and vanishes in a direction toward said opening.

2. In a duct forming a passage for conducting fluid at high supersonic velocities, said duct having an opening, said passage comprising an inner wall at an angle relative to the axis of flow through said passage in a downstream direction, and means forming the surface of said wall compriisng a plurality of surface portions, one group of said surface portions being substantially parallel to the axis of flow through the passage and the other group of said surface portions being at an angle relative to said axis and facing toward said opening, said one group of surface portions being of relatively high reflectivity and low thermal absorption and said other group of surface portions being of relatively high emissivity and radiation, said other group of surfaces receiving reflections from said one group of surfaces and radiating heat toward said opening.

3. In a duct forming a passage for conducting fluid at high supersonic velocities, said duct having an upstream opening, said passage comprising an inner wall converging in a downstream direction and terminating in a throat, and means forming the surface of said wall comprising a plurality of surface portions spaced downstream from said opening, said surface portions alternating in a downstream direction and forming two sets of surfaces, one of said sets of surface portions being substantially parallel to the axis of flow through the passage and the other of said sets of surface portions being at an angle relative to said axis, said one set of surface portions being of relatively high reflectivity and said other of said sets of surface portions being of relatively high emissivity, the surface of high emissivity receiving reflections from said one set of surface portions and facing substantially toward said opening to radiate in the direction of said opening, said surface portions forming an inner roughness in said duct which is at a maximum adjacent said throat and vanishes in a direction toward said upstream opening.

4. In a duct forming an inlet passage for receiving air at high supersonic velocities from an airstream, said duct having an upstream opening, said passage comprising an inner wall converging in a downstream direction and means forming the surface of said wall comprising a plurality of surface portions, one group of said surface portions being substantially parallel to the axis of flow through the passage and the other group of said surface portions being at an angle relative to said axis and facing toward said opening, said one group of surface portions being of relatively high reflectivity and low thermal absorption and said other group of surface portions being of relatively high emissivity and radiation, said other group of surfaces facing toward said opening and receiving reflections from said one group of surfaces and radiating toward said opening.

5. In a duct forming an inlet passage for receiving air at high supersonic velocities from an airstream, said duct having an upstream opening, said passage comprising an inner wall converging in a downstream direction and means forming the surface of said wall comprising a plurality of surface portions spaced downstream from said opening whereby the upstream portion of said wall is relatively smooth, one group of said surface portions being substantially parallel to the axis of flow through the passage and the other group of said surface portions being at an angle relative to said axis, said groups of surface portions forming a roughness or departure from said wall which approximates the height of the laminar portion of boundary layer flow along the wall, said one surface portion being of relatively high reflectivity and said other surface portion being of relatively high emissivity, the surface of high emissivity facing substantially toward said opening to radiate thereto the reflections received from said reflecting surface portions.

References Cited in the file of this patent
UNITED STATES PATENTS

| 2,372,155 | Bosch | Mar. 20, 1945 |
| 2,625,013 | Howard et al. | Jan. 13, 1953 |

FOREIGN PATENTS

| 910,142 | Germany | Apr. 29, 1954 |